UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

VARNISH.

1,037,719.   Specification of Letters Patent.   Patented Sept. 3, 1912.

No Drawing.   Application filed March 14, 1911.   Serial No. 614,430.

*To all whom it may concern:*

Be it known that I, LEO H. BAEKELAND, a citizen of the United States, residing at Yonkers, in the county of Westchester and State of New York, have invented certain new and useful Improvements in Varnishes, of which the following is a specification.

This invention relates to the preparation of solutions or varnishes containing as essential components a condensation product of phenolic bodies and formaldehyde, and a solvent liquid. The condensation products used are such as are capable of transformation by heat into infusible bodies.

It is now well understood in the art that phenolic bodies and formaldehyde are capable of yielding, according to the conditions of reaction, a series of differing condensation products, whereof certain ones are soluble in alcohol, acetone, phenol and some other liquids but may be transformed by continued heating into insoluble bodies. It has been proposed heretofore to prepare varnishes from such initial or partial condensation products by dissolving them in alcohol or acetone, or by dissolving an initial condensation product containing a large excess of phenol in benzol.

I have found that varnishes so prepared present the disadvantage of persistently retaining a certain proportion of water, which very materially lessens their value for certain uses, particularly such as pertain to electrical insulation. Furthermore, alcohols absorb moisture from the atmosphere, and tend therefore, particularly in damp weather, to yield white films and inferior coatings. Free phenol and cresol also retain water very persistently, even at comparatively high temperatures, and constitute therefore a disturbing element, particularly when the solution is to be applied as an electrical insulator.

I have further observed that whereas certain liquid initial condensation products of phenols and formaldehyde containing an excess of phenol or cresol are directly soluble in benzol, the solid initial condensation products are not capable of being so dissolved, after they have been freed by washing or otherwise from any excess of phenol.

I have now found that satisfactory varnishes free from the objections above noted may be prepared from the liquid or solid initial condensation products of phenols and formaldehyde, such as are capable of transformation by heat into insoluble bodies, by dissolving them in a liquid oxygen-compound of the aliphatic series and then adding to the solution a hydrocarbon, preferably with a cyclic carbon group like benzol or its homologues. Under these conditions I am able to prepare solutions which have excellent spreading and drying qualities, show little tendency to absorb or retain water, are particularly adapted for spraying and for the preparation of lacquers, and are furthermore relatively inexpensive.

As examples of suitable liquid oxygen-compounds of the aliphatic series I may mention methyl and ethyl alcohol, amyl alcohol, acetone, amyl acetate, epichlorhydrin and like bodies, or mixtures of these. The hydrocarbon may be petroleum ether, benzol, toluol, xylol, cycloparaffins as trimethylen, such cyclic hydrocarbons as are known to occur in Texas petroleum, or equivalent bodies.

As a specific example of the process I may proceed as follows: The soluble condensation product of phenol or a phenolic body and formaldehyde, capable of transformation by further heating into an infusible body, is first prepared by known methods. For example this part of the process may be carried out as described in my prior Patent No. 954,666, patented April 12, 1910, using a base as a condensing agent; or any other suitable or preferred method may be used. The product may be directly dissolved in one or more of the aliphatic oxygen-containing solvents as above indicated, and the solution reduced to a consistence suitable for its intended use by the addition of an appropriate cyclic hydrocarbon. For example, the condensation product may be dissolved in commercial wood alcohol or acetone in the minimum proportion required to yield a clear solution, and the resulting solution diluted by benzol. The following procedure, for instance, has been found to give satisfactory results: 200 parts by weight of the condensation product of phenols and formaldehyde, preferably freed by washing or otherwise from any excess of phenol or cresol, are dissolved in 10 parts of wood alcohol to which has been added 80 parts of acetone, and the solution is diluted by the addition of 100 parts of benzol.

While the method presents particular advantages as applied to the production of solutions free from uncombined phenol it is not limited thereto, since it is advantageous in all cases where the excess of phenol is not so great as to render the condensation product freely soluble in benzol.

In order to modify the odor of the varnishes prepared as above, any desired odoriferous substance may be added. Also, the varnishes may be compounded with certain materials soluble therein or miscible therewith, as for example resins, oils, including Chinese oil or tung oil, oleo resins and oleo-resinous varnishes, rubber, gutta percha, asphalt, nitrocellulose and like materials, which may impart increased elasticity or other desirable properties to the film.

In the above specification, as well as in the following claims, the word "phenols" is used to designate not only the first member of the phenolic group but its homologues, or phenolic bodies or mixtures thereof, which are equivalent in this reaction; in the same way, the polymers of formaldehyde, or other substances which may engender formaldehyde, may be used as an equivalent of formaldehyde.

The term "varnish" as herein used is to be considered as including broadly all solutions of the character described, whether employed as clear varnishes, or as vehicles for pigments, inert fillers, etc.

I claim:

1. As a new composition of matter, a varnish comprising a condensation product of phenols and formaldehyde, transformable by heat into an infusible body and a solvent therefor, said solvent containing a liquid oxygen-compound of the aliphatic series, and a hydrocarbon.

2. As a new composition of matter, a varnish comprising a condensation product of phenols and formaldehyde, transformable by heat into an infusible body and a solvent therefor, said solvent containing a liquid oxygen-compound of the aliphatic series, and a cyclic hydrocarbon.

3. As a new composition of matter, a varnish comprising a condensation product of phenols and formaldehyde, transformable by heat into an infusible body and a solvent therefor, said solvent containing a liquid oxygen-compound of the aliphatic series, and a hydrocarbon of the benzol series.

4. As a new composition of matter, a varnish comprising a condensation product of phenols and formaldehyde, transformable by heat into an infusible body and a solvent therefor containing a liquid oxygen-compound of the aliphatic series and a hydrocarbon, and another organic body soluble in said solvent or miscible therewith.

5. As a new composition of matter, a varnish comprising a condensation product of phenols and formaldehyde, transformable by heat into an infusible body and a solvent therefor, said solvent containing acetone and a hydrocarbon.

6. As a new composition of matter, a varnish comprising a condensation product of phenols and formaldehyde, transformable by heat into an infusible body and a solvent therefor, said solvent containing acetone and a cyclic hydrocarbon.

7. As a new composition of matter, a varnish comprising a condensation product of phenols and formaldehyde, transformable by heat into an infusible body and a solvent therefor containing an oxygen-compound of the aliphatic series and a hydrocarbon, and Chinese oil or tung oil.

In testimony whereof, I affix my signature in presence of two witnesses.

LEO H. BAEKELAND.

Witnesses:
  HERBERT S. MAY,
  M. S. GORDON, Jr.